United States Patent Office 2,865,938
Patented Dec. 23, 1958

2,865,938
IRON CHOLINE COMPOUND AND PRODUCTION THEREOF

William J. Rosenfelder, Elmhurst, N. Y., assignor, by mesne assignments, to Hyman Rosenstein, New York, N. Y.

No Drawing. Application September 25, 1957
Serial No. 686,028

2 Claims. (Cl. 260—439)

The invention relates to a composition of matter containing iron and to a process for the production thereof. More particularly, it pertains to an organic composition containing iron and includes correlated improvements and discoveries whereby an iron containing organic composition of distinctive properties may be produced.

An object of the invention is the provision of an organic composition containing iron which is water soluble, stable, and suitable for utilization to offset conditions due to an iron deficiency, particularly iron deficiency anemia.

Another object of the invention is to provide a composition containing iron, and choline residues.

A further object of the invention is to provide an iron containing organic composition which may be readily, effectively and economically produced to the desired extent.

An especial object of the invention is the provision of a process for producing an organic iron containing composition by reacting tricholine citrate and ferric citrate in an aqueous medium.

Other objects of the invention will in part be obvious and will in part appear hereinafter.

The invention accordingly comprises the several steps, and the relation of one or more of such steps with respect to each of the others, and the composition possessing the features, properties, and the relation of components which are exemplified in the following detailed disclosure, and the scope of the invention will be indicated in the claims.

In the practice of the invention, a composition of matter is produced which is an organic composition containing in combination, iron, residues of choline and residues of citric acid. More particularly, the iron, choline and citric acid are present in the following relative proportions, viz.: two atoms of ferric iron, three residues of choline and three residues of citric acid. Further, the iron containing organic composition is prepared by reacting tricholine citrate with ferric citrate.

The compound produced has the following formula:

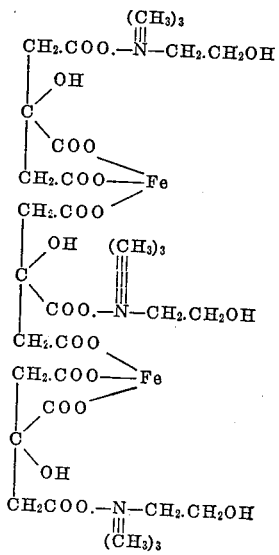

which is produced by reacting one mol of tricholine citrate and two mols of ferric citrate in an aqueous medium. Further, the compound is green in color, has no definite melting point, but begins to char at 208–210° C., is soluble in water, sparingly soluble in methanol, and insoluble in ethanol, ether, chloroform, benzene, toluene and petroleum ether.

As an illustrative embodiment of a manner in which the invention may be practiced, the following example is presented:

Example

One mol of tricholine citrate is dissolved in 6,000 ml. of water and two mols of ferric citrate in solid form are added thereto. The reaction mass is then agitated until solution is effected, and until the reaction mass changes from brown to green. Water is now removed either under vacuum, or as an azeotrope with benzene or toluene or by heating to a temperature of 110° C.–115° C. There is thus obtained a gummy viscous mass which is treated with methanol, about five gallons, whereupon it solidifies, i. e., changes, into a green crystalline compound. Following the treatment with methanol, the mass is filtered and the green compound dried at about 70° C.

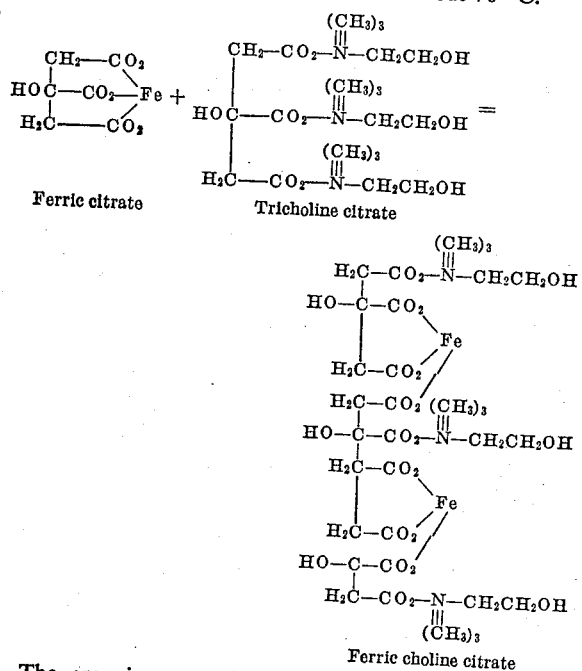

The organic composition containing iron herein described is suitable to offset conditions due to iron deficiency and particularly with respect to iron deficiency anemias. It has been found that when patients with iron deficiency were treated with the ferric choline citrate, with ages varying from 18 to 85, and a daily dosage of 120 mg. of available iron, that a therapeutic response was obtained including symptomatic improvement, increased reticulocyte count and a satisfactory elevation of hemoglobin and hematocrit. It was thus demonstrated that the iron choline citrate is therapeutically active in the treatment of iron deficiency anemia.

This application is a continuation-in-part of my co-pending application Ser. No. 383,400 filed September 30, 1953, now abandoned.

It will thus be seen that the objects set forth above, among those made apparent from the preceding description, are efficiently attained and, since certain changes may be made in carrying out the above process and in the composition set forth without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Having described my invention, what I claim as new and desire to secure by Letters Patent is:

1. A process for the preparation of an iron containing organic compound which comprises reacting one mol of tricholine citrate with two mols of ferric citrate in an aqueous medium.

2. A process for the preparation of an iron containing organic compound which comprises reacting one mol of tricholine citrate with two mols of ferric citrate in an aqueous medium, agitating until the reaction mass changes from brown to green, removing water, treating product thus obtained with methanol, and finally filtering and drying at 70° C.

References Cited in the file of this patent
UNITED STATES PATENTS
2,575,611    Bandelin --------------- Nov. 20, 1951